United States Patent [19]
Sahm et al.

[11] 3,872,114
[45] Mar. 18, 1975

[54] BENZOFURANE DERIVATIVES, PROCESS FOR THEIR MANUFACTURE AND THEIR USE AS OPTICAL BRIGHTENERS

[75] Inventors: Wilfried Sahm, Kelkheim, Taunus; Erich Schinzel, Hofheim, Taunus; Gunter Rosch, Altenhain, Taunus, all of Germany

[73] Assignee: Hoechst Aktiengesellschaft, Frankfurt, Main, Germany

[22] Filed: July 9, 1973

[21] Appl. No.: 377,277

Related U.S. Application Data

[63] Continuation-in-part of Ser. No. 223,771, Feb. 4, 1972, abandoned.

[30] Foreign Application Priority Data
Feb. 5, 1971 Germany............................ 2105305

[52] U.S. Cl.......... 260/240 D, 106/176, 117/33.5 R, 117/33.5 T, 252/94, 252/301.2 W, 252/543, 260/37 NP, 260/37 P, 260/40 R, 260/40 P, 260/75 T, 260/78 S
[51] Int. Cl............................................. C09b 23/14
[58] Field of Search..................... 260/240 D, 240 E

[56] References Cited
UNITED STATES PATENTS

| | | | |
|---|---|---|---|
| 3,492,295 | 1/1970 | Sureau et al..................... | 260/240 D |
| 3,697,513 | 10/1972 | Siegrist....................... | 260/240 D X |
| 3,781,279 | 12/1973 | Crounse et al............... | 260/240 CA |
| 3,796,707 | 3/1974 | Siegrist et al................... | 260/240 D |

OTHER PUBLICATIONS

Acheson et al., J. Chem. Soc. (C) 1970, pp. 1764 to 1784.
Abe et al., Nippon Kagku Zasshi, Vol. 87, pp. 870 to 876 (1966).
Pavlova, Zhurnal Organisheskoi Khimii, Vol. 1, pp. 1827–1831 (Oct. 1965), (corresponding English edition is on pp. 1858–1862).

*Primary Examiner*—John D. Randolph
*Attorney, Agent, or Firm*—Curtis, Morris & Safford

[57] ABSTRACT

Benzofuryl-aryl ethylenes, which are obtainable by HORNER Syntheses, are useful as optical brighteners, especially in surfactants.

18 Claims, No Drawings

BENZOFURANE DERIVATIVES, PROCESS FOR THEIR MANUFACTURE AND THEIR USE AS OPTICAL BRIGHTENERS

This is a continuation-in-part of our copending application Ser. No. 223,771, filed Feb. 4, 1972, now abandoned.

It is already known to prepare benzofurane derivatives which contain in 2-position a phenyl or a stilbyl radical which may be substituted. It is also known to use these compounds as optical brighteners for organic materials (French Patent No. 1,562,477).

The present invention relates to benzofurane derivatives, which are colorless to weakly yellow and which show, in solution, a violet-blue to greenish-blue fluorescence and correspond to the formula (1)

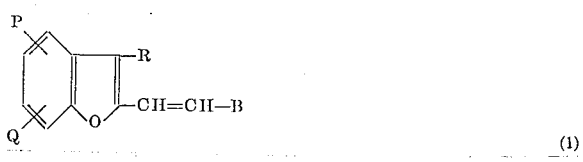

in which P and Q are hydrogen, halogen, lower alkyl, lower alkoxy or phenyl or, together, alkylene of 3 or 4 carbon atoms or an annellated phenyl nucleus, R is hydrogen or lower alkyl and B is an aromatic radical selected from the group consisting of phenyl, naphthyl, furanyl or thienyl which aromatic radical is unsubstituted or substituted by up to three substituents selected from the group consisting of halogen, lower alkyl, lower alkoxy, phenyl, amino, lower alkylamino, di-(lower alkyl)-amino, tri-(lower alkyl)-ammonium, lower alkanoyl amino, cyano and a group of the formula $-COOR^1$, $-SO_2OR^1$, $-CO-NR^2R^3$ or $SO_2NR^2R^3$, wherein $R^1$ is hydrogen, alkyl of 1 to 20 carbon atoms, lower alkyl substituted by hydroxy, lower alkoxy, di-(lower alkyl)-amino or tri-(lower alkyl)-ammonium, and $R^2$ and $R^3$ are hydrogen, lower alkyl or lower alkyl substituted by di-(lower alkyl)-amino or tri-(lower alkyl)-ammonium.

Especially preferred are compounds of formula (1) wherein P and Q are hydrogen, chlorine, methyl, methoxy or phenyl, or P and Q together are trimethylene, tetramethylene or an annellated phenyl nucleus, R is hydrogen or methyl, and B is phenyl substituted by one or two substituents selected from the group consisting of chlorine, methyl, methoxy, phenyl, amino, lower alkylamino, di-(lower alkyl)amino; tri-(lower alkyl-ammonium chloride, methosulfate or tosylate; acetamino, cyano or a group of the formula $-COOR^1$, $-SO_2OR^1$, $-CONR^2R^3$ or $SO_2-NR^2R^3$ wherein $R^1$ is hydrogen, lower alkyl or alkyl of 2 or 3 carbon atoms substituted by hydroxy, lower alkoxy, di-(lower alkyl)-amino or tri-(lower alkyl)-ammonium chloride, methosulfate or tosylate; $R^2$ and $R^3$ are hydrogen, lower alkyl or alkyl of 2 or 3 carbon atoms substituted by di-(lower alkyl) amino or tri(lower alkyl)-ammonium chloride, methosulfate or tosylate.

Particularly preferred are the compounds of the formula (1) in which two of the substituents of B represent hydrogen atoms and the third one represents an electron-attracting group which is standing in ortho or preferably para-position to the styryl group. As electron-attracting group, there is understood in particular the phenyl or a carboxy group which may be modified functionally, especially such as the cyano group or a low molecular carboalkoxy group.

The compounds of the invention can be prepared as follows: In a HORNER synthesis 1 mole of a carbonyl compound (3) is reacted with 1 mole of a furnace compound of the formula (2)

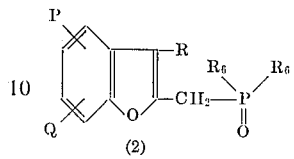 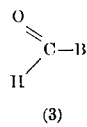

or inversely by reacting 1 mole of a carbonyl compound (5) with 1 mole of a compound of the formula (4)

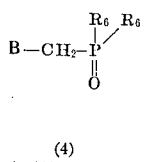 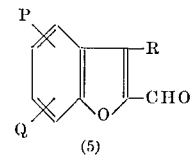

In the above formulae, P, Q, R and B have the meanings given for the general formula (1) and $R^6$ represents identical or different, preferably lower alkyl, cycloalkyl, aralkyl or aryl groups which may be bound over an oxygen atom to the phosphorus atom. Since the radicals $R^6$ are not present in the final product, their chemical nature is not critical with a view to the products of the invention.

The process of the invention is advantageously effected in solutions in inert solvents, for example hydrocarbons such as toluene or xylene or alcohols such as methanol, ethanol, isopropanol, butanol, glycol, glycol ethers such as 2-methoxyethanol, hexanol, cyclohexanol, cyclooctanol, furthermore in ethers such as di-isopropylether, dioxane, tetrahydrofurane, furthermore in formamides and N-methylpyrrolidone. Dipolar organic solvents such as dimethylformamide and dimethyl-sulfoxide are particularly suitable.

As condensating agents, there may be used strong basic compounds such as alkali metal or alkaline earth metal hydroxides, alkali metal or alkaline earth metal alcoholates, alkali metal or alkaline earth metal amides, preferably potassium hydroxide, sodium hydroxide, potassium-tert. butylate or sodium methylate, furthermore the alkali metal compounds of dimethyl sulfoxide and alkali metal hydrides.

The reaction temperature depends on the nature of the starting materials and is in the range of from about 0°C to about 100°C, preferably between about 10°C and about 60°C.

The reaction products of the above-described process can be modified in several manners known per se, which, for example when starting from molecules containing sulfo or carboxy groups lead to compounds containing sulfo or carboxy groups which are modified functionally. Under a carboxy group which is modified functionally, there are to be understood at first its salts with colorless cations, the alkali metal, especially sodium and potassium or ammonium ions such as ammonium and mono- to tetra- (lower alkyl)-ammonium groups, which lower alkyl residues may carry hydroxy groups, being preferred, and furthermore such functional derivatives of a carboxy group which have three bonds to hetero atoms, in particular the cyano group, a carboxylic ester group or a carboxylic acid amide group which groups are as defined above.

Under a functionally modified sulfo group, there are to be understood, in analogy with the above explanation, the salts with colorless cations, preferably alkali metal or ammonium ions, and furthermore such derivatives in which the $SO_2$ group is bound to a hetero atom as is the case in the sulfonic acid ester group and in the sulfonamide group which groups are as defined above.

Compounds having amino or alkylamino groups can be alkylated and dialkylamino groups can be quaternized, especially with alkylating agents of the group lower alkyl halides, lower alkyl sulfates and lower alkyl to ylates (p-toluene sulfonic acid esters). Advantageously, as an alkylating agent methyl chloride, ethyl chloride, methyl sulfate or methyl to ylate are used, however, in principle, any other alkylating or quaternizing agent may be used with the proviso that in forming a quarternary salt the anion is colorless.

Furthermore, sulfo groups may be introduced by treating compounds of formula (1) with sulfonating agents, such as sulfuric acid, which may contain free sulfur trioxide, and chlorosulfonic acid. Likewise, nitro groups may be present in the starting materials and the so-obtained nitro compounds transformed into amino groups in known manner. Thus, when using the compounds defined by the general formulae (2), (3), (4) and (5) with the groups P, Q, R, B and $R^6$ specified as above, there may be prepared, for example, the following compounds:

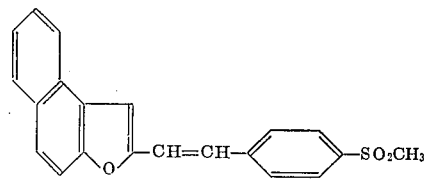
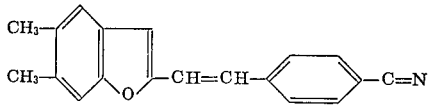
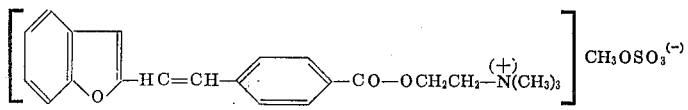
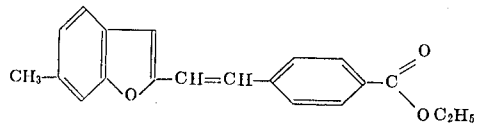
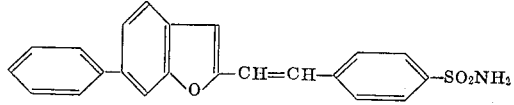
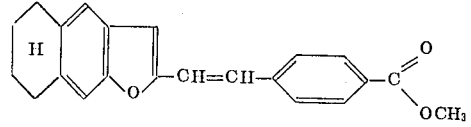
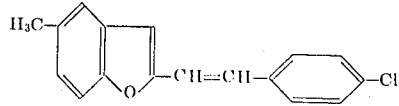
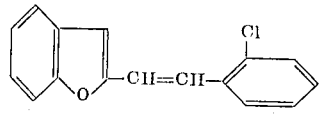
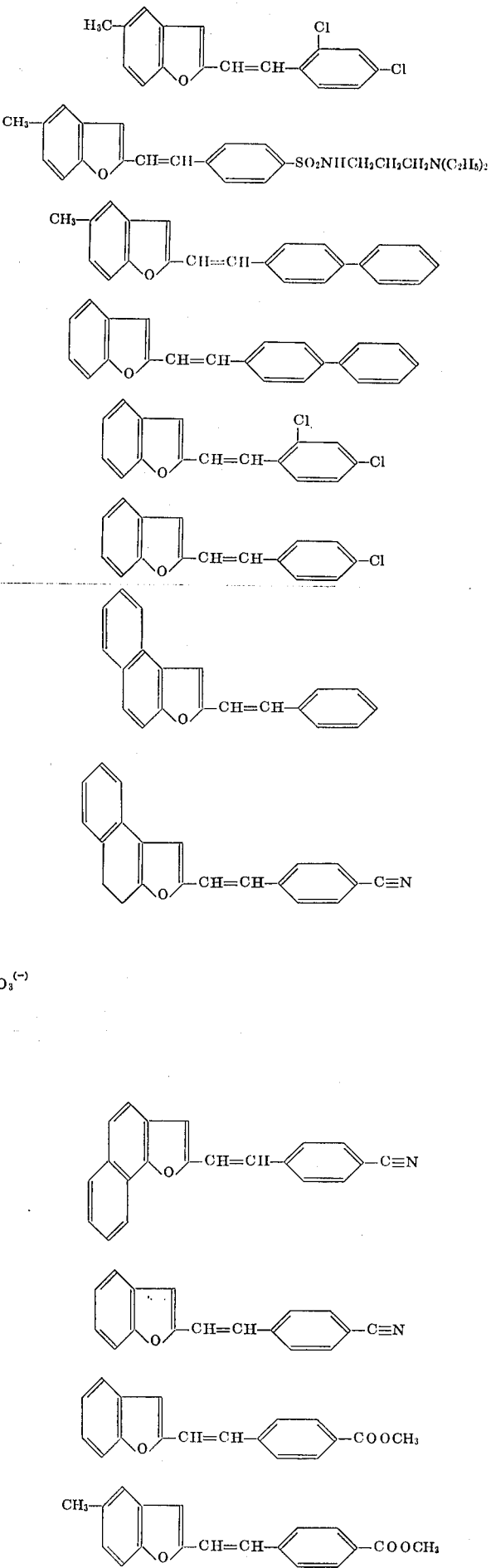

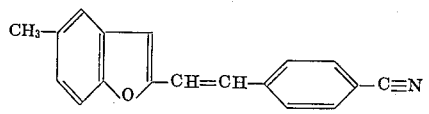
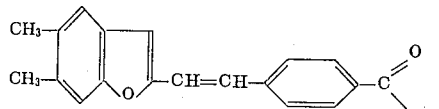
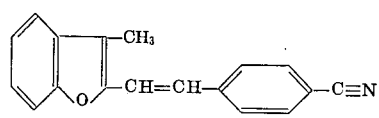
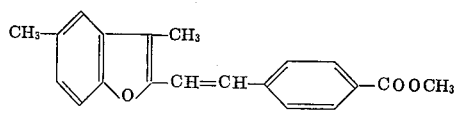
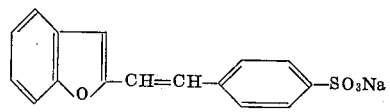
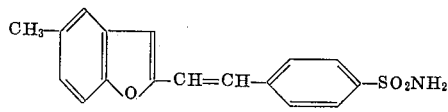
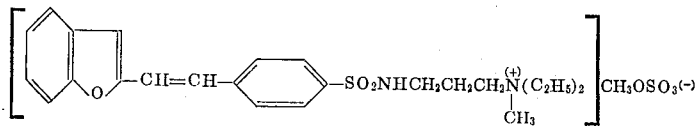
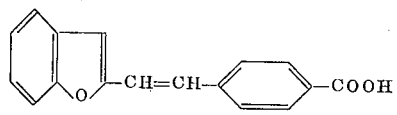
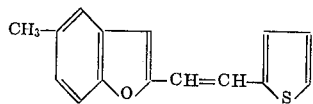
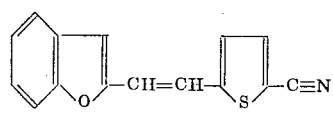
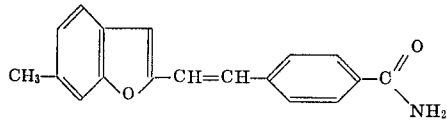
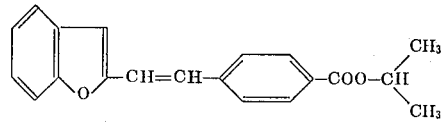
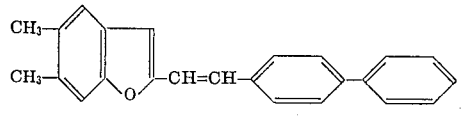
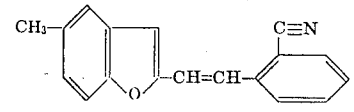

The compounds of the invention which correspond to the general formula (1) show, when dissolved, a more or less marked fluorescence and are suitable for the optical brightening of the most various natural and synthetic organic materials. The latter term implies also to such organic materials which may be used for improving the properties of mineral substances, for example inorganic pigments.

As substrates which may be brightened optically, there may be mentioned, for example lacquers, synthetic fibers, for example those on the basis of acetyl cellulose, polyesters, polyolefins, polyvinyl chloride, polyvinylidene chloride or polyacrylonitrile, as well as foils, films, bands or shaped bodies made of such materials.

Those compounds of the invention which are insoluble in water may be used as solutions in organic solvents or in the form of aqueous dispersions, advantageously with the aid of a dispersing agent. As dispersing agents, there may be used, for example, soaps, polyglycol ethers which are derived from fat alcohols, fatty amines or alky-phenols, cellulose sulfite waste liquors or condensation products of optionally alkylated napthalene-sulfonic acids with formaldehyde.

The anionic compounds of the invention which are soluble in water are especially suitable for the optical brightening of native and regenerated cellulose fibers, of wool and synthetic polyamide fibers.

The cationic compounds of the invention which are soluble in water are especially suitable for the optical brightening of co-polymers of acrylonitrile, especially those having a minimum content of acrylonitrile of about 85%.

The compounds of the invention are partly distinguished by an excellent affinity to various fibrous materials. For this reason, they are particularly suitable for being used also below the boiling temperature, even if the most various types of fibers have to be optically brightened at the same time, for example in softeners, finishing agents, washing agents and wash after-treating agents. Furthermore, they may also be used in admixture with, for example, dyestuffs or chemical bleaching agents.

Moreover, they are stable to hypochlorite and chlorite and can accordingly be used in combination with these substances.

Of course, the compounds of the invention can also be applied at temperatures above the boiling temperature, about at high temperature- or thermosoling-conditions for optical brightening.

Furthermore, the compounds of the invention may be added to high molecular organic materials, before or during their shaping. Thus, in the manufacture of films, foils, bands or shaped bodies, they may be added to the moulding mass or they may be dissolved in the spinning mass before spinning. Suitable compounds may also be added before the polycondensation or polymerisation, as in the case of polyamide-6, polyamide-6,6 or linear esters of the type of the polyethyleneglycol terephthalate, to the low molecular starting materials.

Those compounds of the invention which are substituted by one or, preferably, two carboxy or carbalkoxy groups, can be bound to or into linear polyester molecules and synthetic polyamides by an ester or amide linkage, if they are added under suitable conditions to those materials or, preferably, to the starting materials used. Optical brighteners which are fixed in such a manner by a chemical bond in the substrate are distinguished by a high fastness to sublimation and to solvents.

The quantity of the compounds of the general formula (1) to be used according to the invention, referred to the material to be brightened optically, may vary within wide limits, depending on the field of application and the desired effect. It can be easily determined by preliminary tests and is in general in the range of from about 0.01 and 2% by weight, referred to the goods treated.

The following Examples illustrate the invention:

EXAMPLE 1

A solution of 11.2 g of 3-methyl-benzofurane-2-aldehyde and 17.8 g of p-cyano-benzyl-diethyl-phosphonate in 100 ml of DMF was allowed to run, at an internal temperature of 50°C at the maximum, into a suspension of 8 g of sodium hydroxide (powder, having a strength of about 90%) in 100 ml of DMF. The whole was allowed to react for 30 minutes, then poured onto 1½ liter of ice water and the pH was adjusted to 5–7 by means of concentrated HCl. The yellow precipitate was filtered off with suction, washed with water and dried. 15.6 g of crude product melting at 136°– 145°C were obtained. By recrystallization from n-butanol (100 ml) with addition of active charcoal, the pure 3-methyl-2-(p-cyano-styryl)-benzofurane of the formula

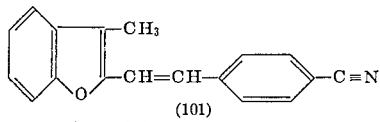

was obtained in the form of yellowish crystals melting at 148° – 151°C. The preparation of 3-methylbenzofurane-2-aldehyde was carried out in analogy to V. Th. Suu, N. P. Buu-Hoi and N. Dat Kuong, Bull. Soc. Chim. France 29, 1875 (1962); melting point: 66.5° – 68°C.

EXAMPLE 2

9.5 of benzofurane-2-aldehyde and 16.45 g of p-cyano-benzyl-diethyl-phosphonate were dissolved in 100 ml of DMF(dimethylformamide). This solution was allowed to run, at a temperature below 30° C, to a suspension of 10 g of potassium hydroxide (powder, 85 %) in 100 ml of DMF. After 30 minutes, the whole was poured onto 1½ liter of ice water and the pH was adjusted to 5 – 7 by means of concentrated HCl. The yellowish precipitate was filtered off with suction, washed with water and dried. 12 g of crude product melting at 147°– 153° C were obtained. By several recrystallizations from n-butanol (100 – 150 ml) with addition of active charcoal, highly pure 2-(p-cyano-styryl)benzofurane of the formula

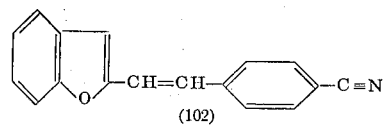

was obtained in the form of light yellow crystals. Melting point: 155° – 156° C.

The analogous reaction with 14.85 g of benzyl-diethyl-phosphonate yielded 2-styryl-benzofurane of the formula

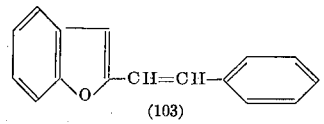

Melting point: 125° C; yield: 12.4 g.

When using instead of the p-cyanobenzyl-diethyl-phosphonate, 18.75 g of p-carbomethoxy-benzyl-phosphonate, 2-(p-carbomethoxy-styryl)-benzofurane of the formula

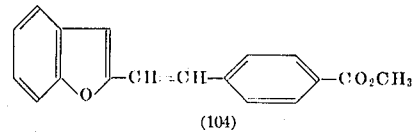

melting point 179° C; yield: 16.1 g, was obtained.

From the methyl ester, there was obtained by saponification the free carboxylic acid of the formula

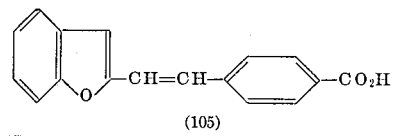

Melting point: >340° C; yield: 92 %.

The saponification was effected by boiling the methyl ester with aqueous-ethanolic sodium hydroxide solution.

EXAMPLE 3

In a manner analogous to that described in Examples 1 and 2, there were obtained from 11.2 g of 5-methyl-benzofurane-2-aldehyde and 17.8 g of p-cyanobenzyl-diethylphosphonate with 8 g of sodium hydroxide powder in a total of 200 ml of DMF, 14.8 g of crude 5-methyl-2-(p-cyanostyryl)-benzofurane. Recrystallization from n-butanol (300 ml) with addition of active charcoal yielded 13.3 g of the pure compound of the formula

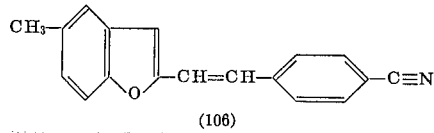

Melting point 182° – 183°C.

The 5-methyl-benzofurane-2-aldehyde was prepared in a manner analogous to that described in Example 1.

EXAMPLE 4

A solution of 7.3 g of benzofurane-2-aldehyde and 15.2 g of phenylbenzyl-diethylphosphonate in 50 ml of DMF was allowed to run, at a temperature of about 60° C, into a suspension of 8 g of sodium hydroxide (powder, about 90% strength) in 100 ml of DMF. After about 60 minutes, the whole was poured into 1½ liter of ice water and the pH-value was adjusted to 5 – 7 by means of concentrated HCl. The yellowish precipitate was filtered off, washed with water, dried and recrystallized from 250 ml of n-butanol with addition of active charcoal. In this manner 6.5 g of 2-(p-phenyl-styryl)benzofurane benzofurane of the formula

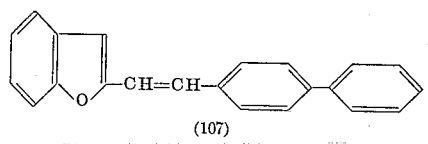
(107)

in the form of greenish yellow crystals melting at 235° – 236° C were obtained.

EXAMPLE 5

When operating according to the method described in Example 4, there -methyl, obtained from 8 g of 5-methyl-benzofurane-2-aldehyde and 15.2 g of p-phenyl-benzyl-diethyl-phosphonate with 6 g of sodium methylate in a total of 200 ml of DMF, after recrystallization from 200 ml of n-butanol with addition of active charcoal, 7.1 g of 5-methyl-2-(p-phenyl-styryl)-benzofurane of the formula

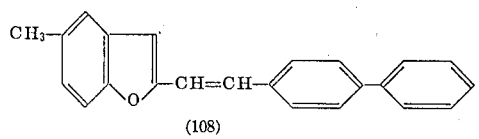
(108)

in the form of greenish yellow crystals melting at 244° – 245°C.

EXAMPLE 6

A fabric of polyethylene glycol terephthalate filaments was impregnated with a disperesion which contained, per liter of water, 1.5 g of the compound of the formula

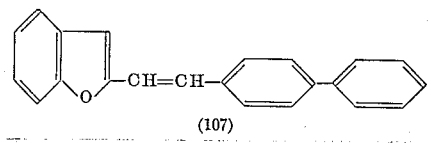
(107)

and 0.5 g of a commercial wetting agent on the basis of an oxethylated fat alcohol having an alkyl radical of 8 carbon atoms and 12 ethylene glycol ether units in the molecule. The fabric so impregnated was squeezed between rollers to a moisture content of 70% and exposed for 30 seconds to the action of dry heat of 180° C.

The fabric so treated showed an excellent slightly reddish whiteness. The degree of whiteness was determined with the ZEISSELREPHO apparatus by ultraviolet stimulation using the filters FMX-C FMY-C and FMZ-C according to the whiteness degree formula of Berger WD = Y + 3 (Z-X). Thus, the fabric treated had a whiteness degree of 156.2 % in comparison to 81 % of the untreated fabric.

EXAMPLE 7

Filaments of texturated polyamide 6 were treated at a ratio of 1 : 10 with a bath which contained, per liter, 0.15 g of the compound of the formula

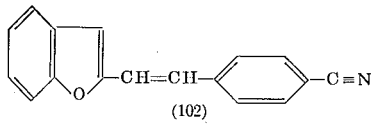
(102)

and 0.5 g of the wetting agent mentioned in Example 6. The material was treated with this solution for 30 minutes at 80° C and then rinsed and dried as usual.

The polyamide filaments showed an excellent degree of whiteness (according to Berger) of 149.5%, as compared to 67.7% of the untreated material.

EXAMPLE 8

A knitted fabric of 2½ acetate was treated, after the usual pre-washing, in a ratio of 1 : 20 on a jigger with a bath which contained, per liter, 0.075 g of the compound (102). The knit fabric was treated with this solution for 45 minutes at 80° C and then rinsed and dried as usual.

The material showed an excellent degree of whiteness (according to Berger) of 124.5% compared to 65.7% of the pre-washed material.

EXAMPLE 9

A fabric of polyethylene-glycol terephthalate was treated at a ratio of 1 : 20 with a washing bath which contained 6 g/l of of a washing agent of the following composition:

9.8 % of isotridecanol-polyglycol ether (with on the average 8 moles of ethylene oxide per mole of isotridecanol)

30 % of sodium tripolyphosphate,
15 % of tetra sodium pyrophosphate,
5 % of sodium meta-silicate,
2 % of carboxymethylcellulose,
38 % of sodium sulfate,
0.2 % of the compound of the formula (102), and
1 g/l of active chlorine from sodium hypo-chlorite.

The fabric was washed for 10 minutes at 25°C, rinsed and dried. This treatment was repeated up to ten times. The fabric showed a very good degree of whiteness(according to Berger) and an distinct increase of the degree of whiteness as compared to the untreated material. (Degree of whiteness abbreviated DW)

Crude material DW: 81.1 %
Washed 1 time: DW: 86.7 %
Washed 10 times DW: 99.9 %.

EXAMPLE 10

A knitted fabric of polyacrylonitrile containing more than 85% of polyacrylonitrile was treated at a ratio of 1 : 20 with a washing bath which contained 6 g/l of the washing agent described in Example 9. The knit fabric was then washed, each time for 10 minutes, at 60° C, then rinsed and dried as usual. This treatment was repeated up to 10 times. The degree of whiteness was sufficient and was, according to Berger:

Crude material DW: 65.6 %

Washed 1 time DW: 71.2 %
Washed 10 times DW: 81.7 %

EXAMPLE 11

A fabric of cotton was treated at a goods to liquor ratio with a bath which contained, per liter, 20 g of a laundry after treating agent having the following composition:
  6.7 % of distearyl-dimethyl-ammonium chloride,
  1 % of butane-diol-ester polyglycol ether,
  92.1 % of water,
  0.2 % of the compound (102).

The fabric was treated each time for 10 minutes at 25° C, rinsed and dried. After 1 and 10 treatments, respectively, the cotton fabric showed the following degrees of whiteness (according to Berger):
  Crude material DW: 87.0 %
  Washed 1 time DW: 101.8 %
  Washed 10 times DW: 129.7 %.

EXAMPLE 12

A fabric of polyester fibers was treated with a solution which contained 0.2 %, referred to the weight of the fabric, of compound (106) and 0.5 g/l of a nonylphenyl-polyglycol ether having 8 oxide units in the molecule, for 45 minutes at 120° C under pressure. The fabric was then rinsed with hot and cold water. After this treatment, the polyester fabric had an excellent degree of whiteness with a reddish tinge.

EXAMPLE 13

A fabric of thermo-stable polyvinyl chloride fibers was treated with a solution which contained, referred to the weight of the fabric, 0.15 % of compound (104) and 0.5 g/l of the polyglycol ether described in Example 12. The fabric was treated for 1 hour at 95° C and then rinsed. After this treatment, the fabric had an excellent degree of whiteness with neutral shade.

EXAMPLE 14

10 Kg of a yarn strand of a commercial polyacrylonitrile copolymer having a proportion of acrylonitrile of at least 85 % were treated with a solution which contained 0.2 % of compound (113). The temperature of the bath was raised within 30 minutes to the boiling temperature and kept for further 30 minutes at this temperature. Then, the bath was slowly cooled to 50° C and the strand was rinsed. The yarn showed an excellent degree of whiteness with reddish tinge.

EXAMPLE 15

25 Kg of fiber flocks of polypropylene were treated with a bath which contained 0.1 %, referred to the weight of the goods, of compound (102) in dispersed form. The compound (102) had been previously dispersed in the ten-fold quantity of a nonylphenolpolyglycol ether containing 10 ethylene oxide units in the molecule. The temperature of the bath was raised within 30 minutes to the boiling temperature and then kept for 30 minutes at this temperature. After cooling and rinsing, the goods were dried. The fibrous material showed an extraordinarily brilliant, slightly reddish degree of whiteness.

EXAMPLE 16

A fabric of polyamide 6 was treaed at a goods to liquor ratio of 1 : 25 with a washing bath which contained, per liter, 0.5 g of a washing agent of the following composition: 9.8 % of isotridecanol-polyglycol ether containing 8 ethylene oxide units in the molecule,
  30 % of sodium tri-polyphosphate,
  15 % of tetrasodium pyrophosphate,
  5 % of sodium meta-silicate,
  2 % of carboxymethylcellulose,
  38.15 % of sodium sulfate,
  0.05 % of the compound (107).

The fabric was washed for 10 minutes at 60°C, rinsed and dried. This treatment was repeated 5 and 10 times, respectively. The fabric showed an excellent degree of whiteness with a reddish tinge. The determination of the degree of whiteness according to Berger, Die Farbe 8 (1959), 187 et seq., gave the following values:
  Crude material DW: 82.1 %
  Washed 5 times DW: 118.4 %
  Washed 10 times DW: 121.3 %.

EXAMPLE 17

A knitted fabric of polyamide 6 was washed at a goods to liquor ratio of 1 : 20 with a washing bath which contained, per liter, 6 g of a washing agent of the following composition:
  12 % of nonylphenol-oxethylate (containing 10 moles of ethylene oxide on the average),
  40 % of sodium tripolyphosphate,
  10 % of sodium meta-silicate,
  3 % of carboxymethylcellulose,
  1 % of fat alcohol $C_{16-18}$,
  0.2 % of compound (102),
  and 100% water.

The knit fabric was washed each time for 10 minutes at 90° C, rinsed and dried. After this treatment, it showed an excellent degree of whiteness (according to Berger):
  Crude material DW: 67.7 %
  Washed 1 time DW: 95.1%
  Washed 10 times DW: 153.6%

The following compounds which have been prepared in analogy to the methods described above may also be used in similar manner.

EXAMPLE 18 (Comparative Tests):

Compared were the following compounds

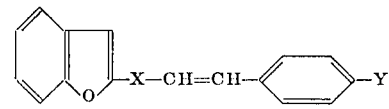

| X | Y | Compound No. |
|---|---|---|
| direct bond | H | 103 |
| p-$C_6H_4$ | H | 182 of French Patent No. 1,562,477 |
| direct bond | $C_6H_5$ | 107 |
| p-$C_6H_4$ | $C_6H_5$ | 186 of French Patent No. 1,562,477 |
| direct bond | CN | 102 |

0.5 g of each one of these compounds were thoroughly mixed with 100 g of an isotridecanol-polyglycol ether containing on an average 8 ethylene glycol units and this mixture was used in compounding the following washing agent:
  50% by weight of sodium tripolyphosphate
  6% by weight of sodium metasilicate
  4% by weight of carboxymethylcellulose, salt containing,
  viscosity (according to Hoeppler) in a 5% solution at 20°C = 1500cP
10% by weight of said isotridecanol-polyglycol ether
0.05% by weight of brightener rest ad 100%: sodium sulfate and water.

A washing liquor was prepared containing 6 g/l of said washing agent and in this washing liquor polyamide-6 fabrics were agitated for 10 minutes at 60°C at a goods to liquor ratio of 1:20. Finally the fabrics were rinsed and dried. The degree of whiteness was determined according to Berger.

| Brightener | Washing Cycles | Degree of Whiteness | Brightening Effect | % Added Brightness |
|---|---|---|---|---|
| — | 0 | 81 | 0 | — |
| 103 | 1 | 87 | 6 | 7.4 |
| 182 | 1 | 85 | 4 | 5 |
| 107 | 1 | 90 | 9 | 11.1 |
| 186 | 1 | 86 | 5 | 6.2 |
| 102 | 1 | 95 | 14 | 17.3 |
| 103 | 5 | 91 | 10 | 12.4 |
| 182 | 5 | 86 | 5 | 6.2 |
| 107 | 5 | 118 | 37 | 45.7 |
| 186 | 5 | 86 | 5 | 6.2 |
| 102 | 5 | 107 | 26 | 32.1 |
| 103 | 10 | 96 | 15 | 18.5 |
| 182 | 10 | 87 | 6 | 7.4 |
| 107 | 10 | 121 | 40 | 49.4 |
| 186 | 10 | 86 | 5 | 6.2 |
| 102 | 10 | 111 | 20 | 24.7 |

This comparison demonstrates that the compounds known from French Patent No. 1,562,477 are inferior to the novel compounds as regards their capability of brightening polyamide-6 under mild washing conditions. Especially after repeated washing cycles the novel compounds show their superiority.

EXAMPLE 19

(Comparative Tests):

Compared were the following compounds

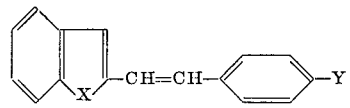

| X | Y | Compound No. |
|---|---|---|
| O | H | 103 |
| S | H | A |
| O | Cl | 110 |
| S | Cl | B |

Compounds A and B are known from J. Chem. Soc. (C) 1970, 1764–1784 (Table 2).
The brightening procedures were as follows:

Process 1

Exhaustive brightening of polyamide-6 (polycaprolactam)

The above-mentioned brighteners were predissolved in the 50-fold amount by weight of dimethylformamide by gentle heating. Into this warm solution the 50-fold amount, referred to the weight of the brightener, of a commercial adjuvant consisting essentially of a nonylphenolpolyglycolether (containing on an average 23 ethyleneglycol units) was added while stirring.

A knitted fabric of polyamide-6 was introduced in a bath of 40°C at a goods to liquor ratio of 1:20 which bath contained, referred to the weight of the good, 0.24% of brightener (predissolved as mentioned above) and 0.5 g/l of a commercial nonylphenolpolyglycolether (containing on an average 10 ethylene glycol units). The bath was adjusted to pH 4.0 by means of oxalic acid and the temperature was raised in the course of 10 minutes to 80°C. This temperature was maintained for 30 minutes. Then the fabric was rinsed and dried.

| Brightener | Degree of Whiteness | Brightening Effect | % Added Brightness |
|---|---|---|---|
| — | 83 | 0 | — |
| 103 | 110 | 27 | 31.5 |
| A | 88 | 5 | 6 |
| 110 | 106 | 23 | 28 |
| B | 86 | 3 | 3.5 |

Process 2

High-temperature exhaustive brightening of polyamide-6

Process 1 was repeated but the temperature of the bath was raised in the course of 15 minutes to 120°C which temperature was maintained for 45 minutes.

| Brightener | Degree of Whiteness | Brightening Effect | % Added Brightness |
|---|---|---|---|
| — | 83 | 0 | — |
| 103 | 118 | 35 | 42 |
| A | 80 | −3 | −3.5 |
| 110 | 103 | 20 | 24 |
| B | 80 | −3 | 3.5 |

Process 3

Exhaustive brightening of cellulose-2 ½ acetate

Process 1 was repeated, however, the good was a fabric woven from cellulose-2 ½-acetate filaments, no adjuvant and no oxalic acid were added to the bath, the concentration of brightener was 0.23% and the temperature of the bath was raised in the course of 15 minutes to 85°C which temperature was maintained for 45 minutes.

| Brightener | Degree of Whiteness | Brightening Effect | % Added Brightness |
|---|---|---|---|
| — | 69 | 0 | — |
| 103 | 105 | 36 | 52 |
| A | 77 | 8 | 11.5 |
| 110 | 91 | 22 | 32 |
| B | 76 | 7 | 10 |

Process 4

Exhaustive brightening of polyacrylonitrile

Process 1 was repeated, however, the good was a fabric woven from a polyacrylonitrile yarn, the concentration of the brightener was 0.20%, the pH was adjusted with formic acid and the temperature was raised in the course of 20 minutes to 98°C.

| Brightener | Degree of Whiteness | Brightening Effect | % Added Brightness |
|---|---|---|---|
| — | 71 | 0 | — |
| 103 | 109 | 38 | 53.5 |
| A | 77 | 6 | 8.5 |
| 110 | 91 | 20 | 28 |
| B | 76 | 5 | 7 |

TABLE 1 benzofuran-2-yl—CH=CH—B

| Number | B | Melting point (°C.) | λ Max. (nm.) | ε·10⁻⁴ |
|---|---|---|---|---|
| 109 | —C₆H₄—CH₃ | 143–144 | 340 | 5.02 |
| 110 | —C₆H₄—Cl | 150 | 341 | 4.94 |
| 111 | —C₆H₄—Cl (ortho) | 75–77 | 342 | 4.09 |
| 112 | —C₆H₃(Cl)(Cl) | 136–137 | 349 | 4.32 |
| 113 | —C₆H₄—COOCH₂CH₂N(CH₃)₃]⁺ CH₃OSO₃⁻ | ......... | 355 | 4.65 |
| 114 | —C₆H₄—OCH₃ | 146–148 | 346 | 4.85 |
| 115 | —C₆H₄—NHCOCH₃ | 236–238 | 353 | 5.54 |
| 116 | —C₆H₄—NH₂ | 160–163 | 370 | 4.34 |
| 117 | —C₆H₄—N(CH₃)₂ | 196–198 | 380 | 4.81 |
| 118 | —C₆H₄—COO—C(CH₃)₃ | 191–193 | 351 | 5.57 |
| 119 | —C₆H₄—COO—C₈H₁₇(n) | 88–89 | 353 | 4.82 |
| 120 | —C₆H₄—COOC₁₂H₂₅(n) | 280–289 | 353 | 4.75 |
| 121 | —C₆H₄—COOCH₂CH₂N(CH₃)₂ | 91–92 | 353 | 4.80 |
| 122 | —C₆H₄—SO₃Na (ortho) | ......... | 341 | 2.69 |
| 123 | —C₆H₃(SO₃Na)(SO₃Na) | ......... | 347 | 3.80 |
| 124 | —C₆H₄—SO₂OC₂H₅ | 184–186 | 346 | 4.46 |
| 125 | —C₆H₄—SO₂N(CH₃)₂ | 207–208 | 349 | 4.78 |
| 126 | —C₆H₄—NO₂ | 207–209 | 382 | 2.96 |
| 127 | —C₆H₄—N(⁺)(CH₃)₃]⁺ CH₃OSO₃⁻ | ......... | 341 | 4.60 |
| 128 | —C₆H₃(OCH₃)(CN) | 149–151 | 356 | 5.00 |
| 129 | —naphthyl | 134–136 | 350 | 3.37 |

TABLE 1 – Continued
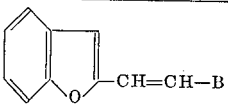—CH=CH—B
| Number | B | Melting point (° C.) | Absorption in dimethylformamide λ Max. (nm.) | $\epsilon \cdot 10^{-4}$ |
|---|---|---|---|---|
| 130 | 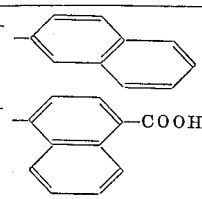 | 190–192 | 348 | 5.61 |
| 131 | 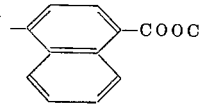—COOH | 255–257 | 373 | 3.37 |
| 132 | 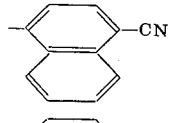—COOCH₃ | 103–105 | 375 | 3.36 |
| 133 | 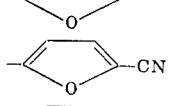—CN | 152–154 | 382 | 3.39 |
| 134 | 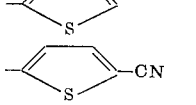 | 73–75 | 343 | 4.82 |
| 135 | 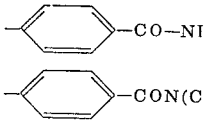—CN | 113–115 | 357 | 4.72 |
| 136 | 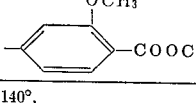 | 123–125 | 355 | 4.01 |
| 137 | —CN | ¹179 | 373 | 4.25 |
| 138 | 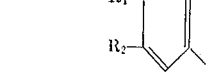—CO—NH₂ | 279–281 | 348 | 4.82 |
| 139 | 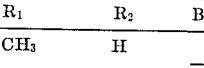—CON(CH₃)₂ | 174–176 | 343 | 4.88 |
| 140 | 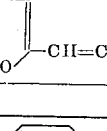 OCH₃ —COOCH₃ | 112–114 | 352 | 4.58 |
¹ Conversion point 140°.
TABLE 2
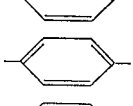—CH=CH—B
| Number | R₁ | R₂ | B | Melting point (° C.) | Absorption in dimethylformamide $\lambda_{max}$ (nm.) | $\epsilon \cdot 10^{-4}$ |
|---|---|---|---|---|---|---|
| 141 | CH₃ | H | 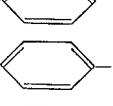 | 144–145 | 338 | 4.85 |
| 142 | CH₃ | H | 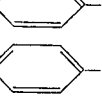—COOCH₃ | 197–198 | 356 | 4.70 |
| 143 | H | CH₃ | 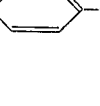 | 126–128 | 341 | 4.74 |
| 144 | H | CH₃ | —⌬—Cl | 162–164 | 345 | 5.01 |
| 145 | H | CH₃ | —⌬—COOCH₃ | 168–170 | 360 | 4.64 |
| 146 | H | CH₃ | —⌬—CN | 168–170 | 358 | 4.61 |
| 147 | H | CH₃ | —⌬—⌬ | 211–213 | 358 | 5.84 |

TABLE 2 - Continued

Structure: benzofuran with R₁, R₂ substituents, and -CH=CH-B at 2-position

| Number | R₁ | R₂ | B | Melting point (°C.) | λmax (nm.) | ε·10⁻⁴ |
|---|---|---|---|---|---|---|
| 148 | H | CH₃ | naphthalene | 136-137 | 362 | 3.39 |
| 149 | H | CH₃ | naphthalene | 173-175 | 360 | 4.64 |
| 150 | (CH₃)₃C— | H | C₆H₄-CN | 160-162 | 357 | 4.83 |
| 151 | CH₃ | CH₃ | C₆H₅ | 144-146 | 342 | 4.79 |
| 152 | CH₃ | CH₃ | C₆H₄-Cl | 189-191 | 347 | 4.99 |
| 153 | CH₃ | CH₃ | C₆H₄-COOCH₃ | 118-121 | 362 | 4.18 |
| 154 | CH₃ | CH₃ | C₆H₄-CN | 217-219 | 362 | 4.64 |
| 155 | CH₃ | CH₃ | C₆H₄-C₆H₅ | 238-240 | 360 | 5.81 |
| 156 | CH₃ | CH₃ | OCH₃, C₆H₃-CN | 182-184 | 364 | 4.90 |
| 157 | CH₃ | CH₃ | OCH₃, C₆H₃-COOCH₃ | 160-162 | 360 | 4.67 |
| 158 | —CH₂—CH₂—CH₂— | | C₆H₅ | 163-165 | 344 | 5.0 |
| 159 | —CH₂—CH₂—CH₂— | | C₆H₄-Cl | 199-201 | 349 | 5.15 |
| 160 | —CH₂—CH₂—CH₂— | | C₆H₄-COOCH₃ | 205-207 | 363 | 4.76 |
| 161 | —CH₂—CH₂—CH₂— | | C₆H₄-CN | 198-199 | 364 | 4.73 |
| 162 | —CH₂—CH₂—CH₂— | | C₆H₄-C₆H₅ | 249-251 | 362 | 6.05 |
| 163 | —CH₂—CH₂—CH₂— | | naphthalene | 220-221 | 355.5 | 5.94 |
| 164 | H | CH₃O— | C₆H₅ | 110-121 | 347 | 4.47 |
| 165 | H | CH₃O— | C₆H₄-Cl | 139-140 | 354 | 4.66 |
| 166 | H | CH₃O— | C₆H₄-COOCH₃ | 157-159 | 368 | 4.30 |
| 167 | H | CH₃O— | C₆H₄-CN | 151-153 | 370 | 4.29 |
| 168 | H | CH₃O— | C₆H₄-C₆H₅ | 204-206 | 363 | 5.51 |
| 169 | H | CH₃O— | naphthalene | 138-140 | 357 | 5.14 |

TABLE 3

| No. | Constitution | Melting point (°C.) | Absorption in dimethylformamide | |
|---|---|---|---|---|
| | | | $\lambda_{max.}$ (nm.) | $\epsilon \cdot 10^{-4}$ |
| 170 |  | 166–172 | 359 | 4.98 |
| 171 |  | 235–236 | 358 | 4.75 |

We claim:

1. A compound of the formula

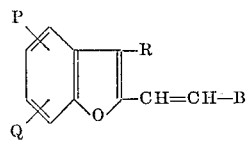

in which P and Q are hydrogen, halogen, lower alkyl, lower alkoxy or phenyl or, together, alkylene of 3 or 4 carbon atoms or an annellated phenyl nucleus; R is hydrogen or lower alkyl and B is an aromatic radical selected from the group consisting of phenyl, naphthyl, furanyl or thienyl which aromatic radical is unsubstituted or substituted by up to three substituents selected from the group consisting of halogen, lower alkyl, lower alkoxy, phenyl, amino, lower alkylamino, di-(lower alkyl) amino, tri-(lower alkyl) ammonium, lower alkanoyl amino, cyano and a group of the formula —COOR$^1$, —SO$_2$OR$^1$, —CO-NR$^2$R$^3$ or SO$_2$NR$^2$R$^3$ wherein R$^1$ is hydrogen, alkyl of 1 to 20 carbon atoms, lower alkyl substituted by hydroxy, lower alkoxy, di-(lower alkyl)-amino or tri-(lower alkyl)-ammonium; and R$^2$ and R$^3$ are hydrogen, lower alkyl or lower alkyl substituted by di-(lower alkyl)-amino or tri-(lower alkyl)-ammonium.

2. A compound as defined in claim 1, wherein P and Q are hydrogen, chlorine, methyl, methoxy or phenyl, or P and Q together are trimethylene, tetramethylene or an annellated phenyl nucleus, R is hydrogen or methyl, and B is phenyl substituted by one or two substituents selected from the group consisting of chlorine, methyl, methoxy, phenyl, amino, lower alkylamino, di-(lower alkyl)-amino; tri-(lower alkyl) ammonium chloride, methosulfate or tosylate; acetamino, cyano or a group of the formula —COOR$^1$, -SO$_2$OR$^1$, -CONR$^2$R$^3$ or SO$_2$—NR$^2$R$^3$ wherein R$^1$ is hydrogen, lower alkyl or alkyl of 2 or 3 carbon atoms substituted by hydroxy, lower alkoxy, di-(lower alkyl(amino amino or tri-(lower alkyl)-ammonium chloride, methosulfate or tosylate; R$^2$ and R$^3$ are hydrogen, lower alkyl or alkyl of 2 or 3 carbon atoms substituted by di-(lower alkyl)-amino or tri-(lower alkyl)-ammonium chloride, methosulfate or tosylate.

3. A compound as defined in claim 1, wherein P and Q are hydrogen or methyl or P and Q together are trimethylene, tetramethylene or an annellated phenyl nucleus, R is hydrogen or methyl and B is phenyl substituted in ortho- or para-position by phenyl, cyano or lower carboalkoxy.

4. A compound as defined in claim 1, wherein P and Q are bound to the 5- and 6-position of the benzofurane nucleus.

5. A compound as defined in claim 1, wherein B is p-cyanophenyl, p-carbomethoxyphenyl or p-biphenylyl.

6. A compound as defined in claim 5, wherein R is hydrogen, P is hydrogen or 5-methyl and Q is hydrogen of 6-methyl.

7. The compound as defined in claim 1, wherein P, Q and R are hydrogen and B is p-cyanophenyl.

8. The compound as defined in claim 1, wherein P is hydrogen, Q is 6-methyl, R is hydrogen and B is p-cyanophenyl.

9. The compound as defined in claim 1, wherein Q and R are hydrogen, P is 5-methyl and B is p-cyanophenyl.

10. The compound as defined in claim 1, wherein P is 5 methyl, Q is 6-methyl, R is hydrogen and B is p-cyanophenyl.

11. The compound as defined in claim 1, wherein P, Q and R are hydrogen and B is p-carbomethoxyphenyl.

12. The compound as defined in claim 1, wherein P and R are hydrogen, Q is 6-methyl and B is p-carbomethoxyphenyl.

13. The compound as defined in claim 1, wherein Q and R are hydrogen, P is 5-methyl and B is p-carbomethoxyphenyl.

14. The compound as defined in claim 1, wherein P is 5-methyl, Q is 6-methyl, R is hydrogen and B is p-carbomethoxyphenyl.

15. The compound as defined in claim 1, wherein P, Q and R are hydrogen and B is p-biphenylyl.

16. The compound as defined in claim 1, wherein P and R are hydrogen, Q is 6-methyl and B is p-biphenylyl.

17. The compound as defined in claim 1, wherein Q and R are hydrogen, P is 5-methyl and B is p-bisphenylyl.

18. The compound as defined in claim 1, wherein P is 5-methyl, Q is 6-methyl, R is hydrogen and B is p-biphenylyl.

* * * * *